United States Patent
Uchida et al.

[15] 3,691,917
[45] Sept. 19, 1972

[54] AUTOMATIC EXPOSURE CONTROL SYSTEM FOR A SINGLE LENS REFLEX CAMERA

[72] Inventors: Yasuo Uchida; Yoshitaka Kuroyanagi, both of Tokyo, Japan

[73] Assignee: Kanishiroku Photo Industry Co., Ltd

[22] Filed: Dec. 4, 1970

[21] Appl. No.: 95,233

[30] Foreign Application Priority Data

Dec. 11, 1969   Japan ......................44/99028

[52] U.S. Cl. ................95/10 PO, 95/10 CT, 95/64 B
[51] Int. Cl. ..............................................G03b 7/08
[58] Field of Search ..............95/10 C, 10 CT, 10 PO

[56] References Cited

UNITED STATES PATENTS 3,442,190   5/1969   Erickson..................95/10 CT

*Primary Examiner*—Samuel S. Matthews
*Assistant Examiner*—Russell E. Adams, Jr.
*Attorney*—Harry C. Bierman, Jordan B. Bierman and Bierman & Bierman

[57] ABSTRACT

An automatic exposure control system for a single lens reflex camera, in which provision is made such that after the operations of focusing and the like have been carried out with the diaphragm opened at its maximum aperture, the shutter button is depressed so that the diaphragm may be closed to a predetermined aperture stop value simultaneously with the jump up of the reflector mirror and the amount of light passed through the lens may be measured by means of a photo-conductive element located behind the mirror to achieve the time control for the shutter speed.

9 Claims, 4 Drawing Figures

AUTOMATIC EXPOSURE CONTROL SYSTEM FOR A SINGLE LENS REFLEX CAMERA

The present invention relates to an automatic exposure control system for a single lens reflex camera which carries out the automatic exposure control by measuring the amount of light passed through an object, and more particularly to an automatic exposure control system for a single lens reflex camera which automatically controls the exposure time after presetting the aperture stop in preference.

As a through-the-lens type of photometric system to be used in a single lens reflex camera, both a reduced-aperture photometric system and a maximum-aperture photometric system have been employed.

Since the reduced-aperture photometric system in a single lens reflex camera carries out the photometry after the aperture of an objective has been reduced, it has disadvantages that the field of a view finder becomes dark and results in inconvenience upon operation such as focus adjustment and the like, and that because the intensity of the incident light to the photoelectric element is weakened by the reduced aperture of the diaphragm blades, the effect of the light coming through the view finder eye-piece appears distinctly and results in errors at the measured value of photometry.

Because of the aforementioned disadvantages, in a through-the-lens type of single lens reflex cameras, the maximum-aperture photometric system has been more frequently employed.

However, the maximum-aperture photometric system has a disadvantage that because a difference would normally occur between the preset aperture stop value and the aperture stop value to which the aperture is actually reduced upon exposure of the film, not always a proper exposure can be attained, if the photometry is carried out after the aperture stop value has been preset and a photograph is taken on the basis of the measured value of photometry.

It is due to the fact that when the photometry is carried out under the maximum-aperture state, the exposure time is preset, and the release button is depressed, at first the aperture is reduced towards the preset aperture stop value, and then the actually reduced aperture may possibly not become the aperture corresponding to said preset aperture stop value due to looseness or the like of the aperture stop mechanism, because the aperture stop blades are quickly moved to the reduced-aperture positions owing to a resilient force of a spring.

Especially, in case that a wide angle objective is used and a photograph is taken at a small aperture of diaphragm blades, said difference grows even to ±½ stop of the aperture, and thus it cannot be neglected.

According to the present invention, the above-mentioned disadvantage in the maximum-aperture photometric system can be eliminated.

The present invention will be described with reference to the accompanying drawings, wherein.

Figure 1:
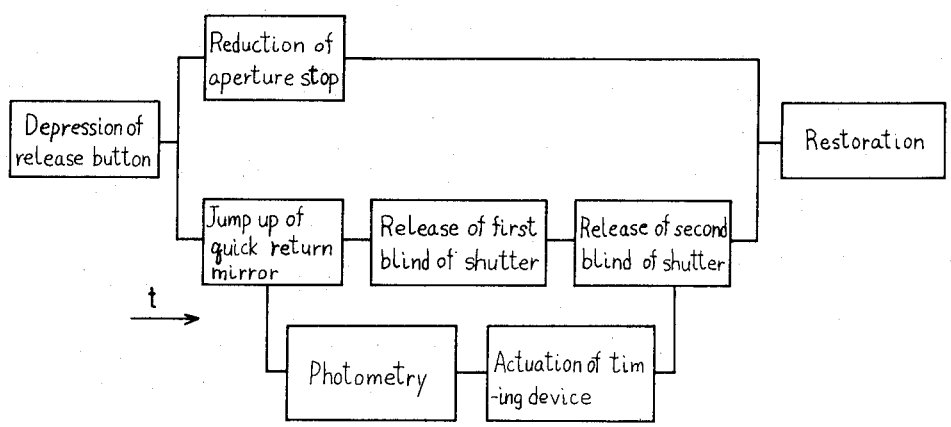
FIG. 1 is a block diagram showing the system according to the present invention.

The system according to the present invention is a system which carries out an automatic exposure control through the various steps as illustrated in FIG. 1. In this figure, an arrow $t$, the direction from left to right indicates the transient of time.

The camera employing the system according to the present invention is provided with an objective having an automatic aperture control machanism. Accordingly, even if the aperture stop has been preset at a desired aperture stop value, the diaphragm blades are still opened at the maximum aperture, so that it is possible to carry out a focus adjustment and the like through a bright view finder.

After the preliminary operations for taking a photograph such as, for example, an aperture stop preset, a focus adjustment, etc. have been carried out, at first the release button is depressed as shown in FIG. 1.

If the release button is depressed, in the next stage the aperture is reduced towards the predetermined aperture stop value, and simultaneously therewith a quick return mirror jumps up. As a mechanism for such purpose, any known mechanism may be employed.

Then, a photometry by means of a photoelectric element is conducted. The photoelectric element is disposed behind the objective within the camera. Therefore, the light projected onto the photoelectric cell is only the light which has passed through the aperture of the stop which was actually reduced. Then the first blind of a focal plane shutter is released to start exposure of the film.

In this connection, upon exposure of the film, the photoelectric element is adapted to be retracted out of the optical path for taking a photograph. As means for carrying out this operation, various means known in the prior art can be employed such as, for instance, means for mounting the photoelectric element on the preceding curtain of the shutter, or means for mounting the photo-electric element in front of the film surface so as to be freely erected up or laid down.

Since the time available for the photometry is an extremely short time interval (normally several tens milliseconds) after the step of jumping up of the quick return mirror and reducing the aperture until the step of releasing the first blind, as the photoelectric element, one having a quick photoelectric response is required. A silicon photovoltaic cell, a selenium photovoltaic cell, etc. are photoelectric elements which are suitable for this purpose.

Then a timing device for controlling the exposure time is actuated. And finally a second blind of the focal plane shutter is released by the timing device, whereby the shutter is closed and the exposure is completed.

Subsequently to the completion of exposure, the diaphragm blades, the quick return mirror, the timing device, etc. are restored to their initial states prior to the exposure, as is the case with the known cameras in the prior art.

Figure 2:
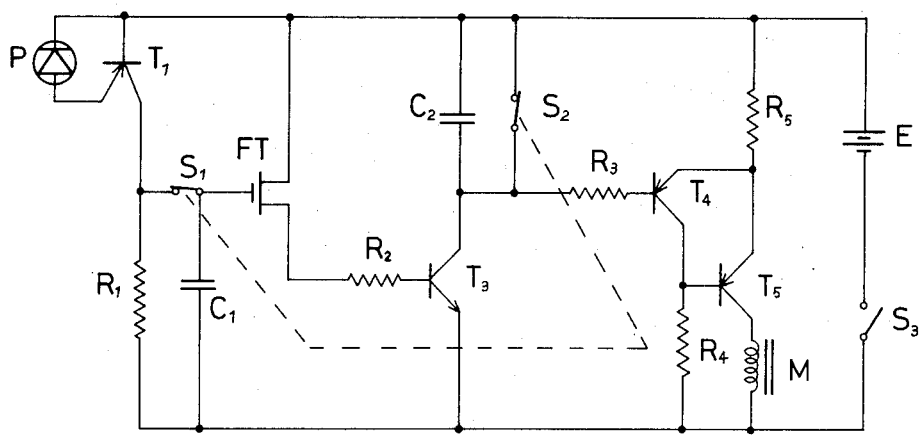
FIG. 2 is a circuit diagram of an electric control section in one preferred embodiment of the present invention.
Figure 4:
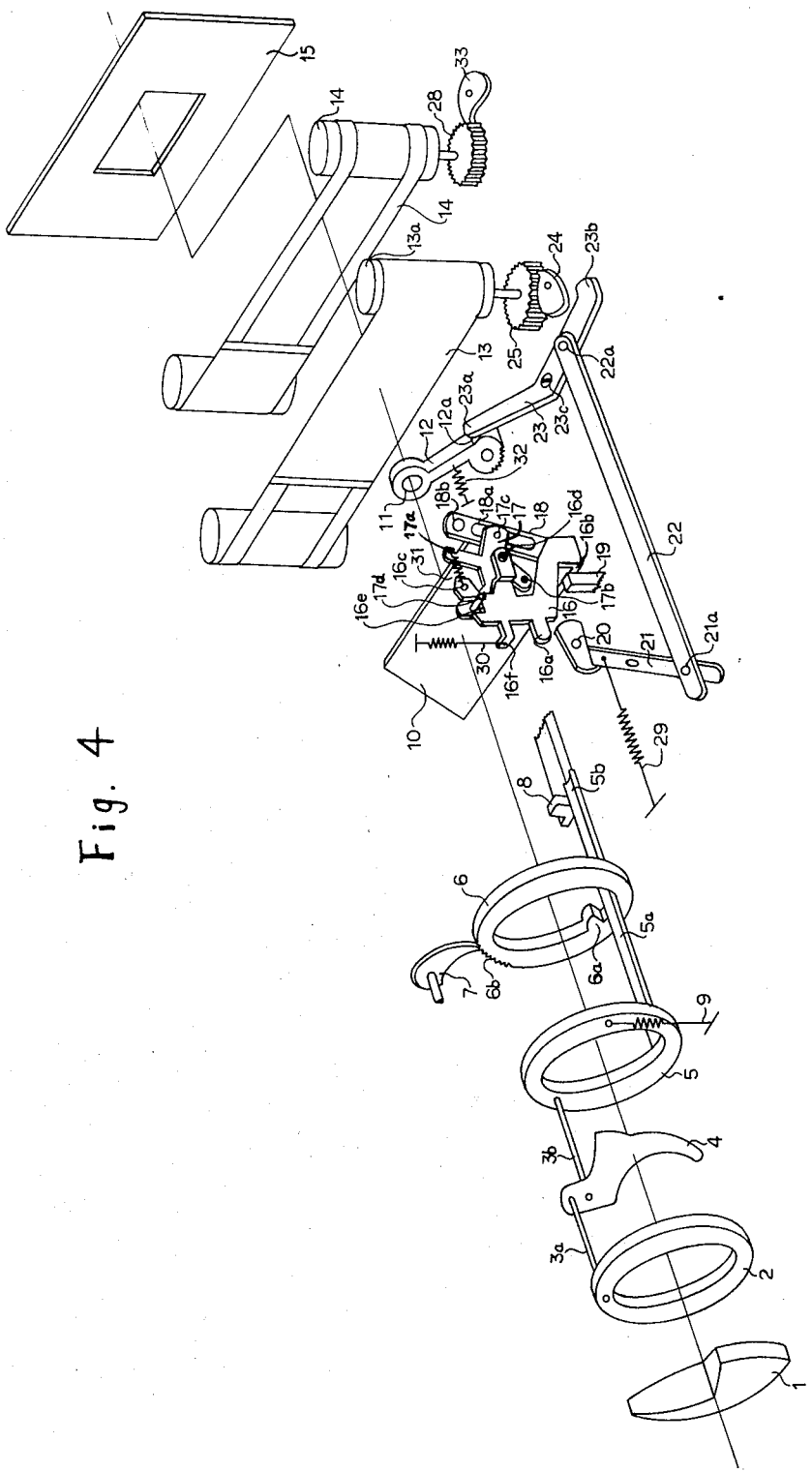
FIG. 4 is an exploded perspective view of one preferred embodiment of the present invention.

FIG. 2 is a circuit diagram of an electric control section of one preferred embodiment of the present invention.

In this figure, reference character P represents a photoelectric element. The photoelectric element P is mounted on the first blind of the focal plane shutter. Alternatively, the photoelectric element P may be disposed in front of the film surface, for instance, just before the shutter blinds so as to be freely erected up or laid down, as described previously, in such manner that it may be kept in an erected state until the step of photometry illustrated in FIG. 1 and then it may be laid down to be retracted out of the optical path for taking a photograph just prior to the release of the preceding curtain of the shutter. Reference characters $T_1$, $T_3$, $T_4$ and $T_5$ represent transistors, respectively, while reference FT represents a field-effect transistor. Reference character $C_1$ represents a capacitor, which is connected between the gate of the field-effect transistor FT and the emitter of the transistor $T_3$. Reference character $R_1$ represents a resistor that is connected across the capacitor $C_1$ via a switch $S_1$. Reference character $C_2$ represents a capacitor forming a part of a timing circuitry, which is connected at one end to the collector of the transistor $T_3$ and at the other end to a positive terminal of a power supply battery E. Reference characters $R_2$, $R_3$, $R_4$ and $R_5$ represent resistors, respectively, and reference character M represents an electromagnet which causes the second blind of the focal plane shutter to be released upon its actuation. Reference characters $S_1$ and $S_2$ represent normally closed switches, which are linked with the first blind of the focal plane shutter so that they may be opened upon release of said first blind. Reference character $S_3$ represents a normally opened switch, which is linked with the shutter release button so as to be closed upon its depression.

Now the operation of the circuit will be explained. By depressing the shutter release button, at first the switch $S_3$ is closed. By the closure of the switch $S_3$, the transistor $T_5$ becomes conducting to cause the electromagnet M to be energized, and thereby the second blind of the shutter is locked at its starting position.

Then, the aperture of the objective is reduced, and simultaneously therewith the quick return mirror jumps up.

By the jump up of the quick return mirror, the photoelectric element becomes irradiated with the incident light. The intensity of the light projecting onto the photoelectric element P is that corresponding to the given combination of the brightness of the subject and the reduced size of the aperture.

Figure 3:
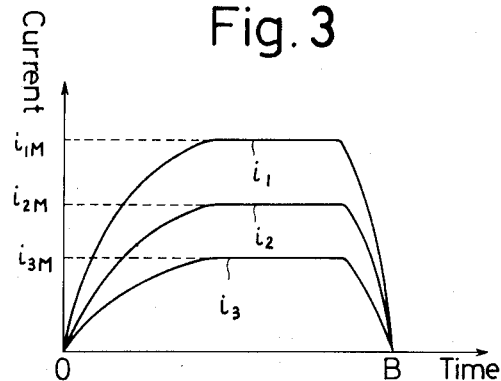
FIG. 3 is a diagram showing the changes in the output of the photo-electric element employed in said embodiment.

The output current of the photoelectric element P changes as illustrated in FIG. 3. In more particular, after the quick return mirror has begun to rise at the point O, the light projecting onto the photoelectric element P becomes successively stronger as the mirror rises higher, and thereby the photoelectric current $i_1$ is increased. When the mirror has reached the highest position, the current attains its maximum value $i_{1M}$. Thereafter, when the first blind of the shutter has been released, the photoelectric element P mounted on said first blind of the shutter begins to be retraced out of the optical path for taking a photograph, and consequently the photoelectric current $i_1$ is reduced until it becomes zero at the point B.

The output current of the photoelectric element P is proportional to the intensity of the incident light passed through the reduced aperture. Therefore, the output current varies according to the various aperture stop values and the degrees of brightness of the subject as illustrated at $i_2$ and $i_3$. Through the base-collector circuit of the transistor $T_1$ flows a current which is proportional to the output current $i_1$, $i_2$, $i_3$ or the like of the photoelectric element P. Owing to the output of the transistor $T_1$, a voltage corresponding to the photoelectric current $i_1$, $i_2$, $i_3$ or the like is generated across the resistor $R_1$, and thus across the capacitor $C_1$. This voltage is a voltage corresponding to the given combination of the area of the reduced aperture of the stop and the brightness of the subject. Subsequently when the first blind of the shutter is released, the switches $S_1$ and $S_2$ are opened in a linked manner therewith. As the first blind of the shutter is moved, the photoelectric element P is retracted out of the optical path, and accordingly its output current is reduced to zero as illustrated in FIG. 3. However, since the switch $S_1$ is opened and the input impedance of the field-effect transistor FT is extremely high, the voltage across the capacitor $C_1$ does not decay, even though the output current of the photoelectric element P has been reduced to zero and thus the output current of the transistor $T_1$ has been reduced to zero. In other words, the output current of the photoelectric element P, that is, the intensity of the incident light onto the photoelectric element P is stored in the capacitor $C_1$ in the form of voltage.

On the other hand, from the moment when the switch $S_2$ has been opened, charging of the capacitor $C_2$ is commenced, and since the output current of the field-effect transistor FT is a current proportional to the voltage across the capacitor $C_1$, the charging current for the capacitor $C_2$ which is a current amplified by the transistor $T_3$ from said output current, is proportional to the voltage across the capacitor $C_1$. When the voltage across the capacitor $C_2$ has reached the trigger level for switching the transistor $T_4$, said transistor $T_4$ becomes conducting, while the transistor $T_5$ becomes non-conducting and the electromagnet M is denergized, resulting in unlocking of the second flind of the shutter, so that the shutter is closed and thus the exposure is completed.

Because the time interval from the point of time when the switch $S_2$ is opened (the point of time when the first blind of the shutter is released) until the point of time when the voltage across the capacitor $C_2$ reaches the trigger level and thereby the second blind of the shutter is released corresponds to the voltage across the capacitor $C_1$, as will be obvious from the preceding description, the exposure time corresponds to the actually reduced aperture of the stop and the brightness of the subject, and in this way the automatic exposure control is achieved. A fixed diaphragm ring 2 and a movable diaphragm ring 5 located behind an objective 1 have, as shown in the drawing, diaphragm blade driving pins 3a and 3b to actuate the diaphragm blade 4, respectively.

The movable diaphragm ring 5 has an arm 5a, the leading end 5b of which is adapted to contact with a connecting lever 8 against the action of spring 9 biased in the direction to reduce the opening of the aperture when an objective assembly is mounted on the camera body.

Therefore, after the objective assembly has been mounted on the camera body, the diaphragm is always kept open and the field of the view-finder is kept bright.

When taking a photograph, a preset ring 6 is rotated clockwise beforehand according to the brightness of the object to be photographed and a stopper 7 is engaged with indented portion 6b at a position in accordance with the aperture stop value thereby setting the diaphragm.

After focusing has been made with the diaphragm opened at its maximum aperture, a release button (not shown) is depressed. Then, a quick return mirror 10 jumps up, and at the same time, the connecting lever 8 is moved away from the end 5b of the arm 5a of the movable diaphragm ring 5 so as to rotate the ring 5 clockwise by the tension of the spring 9 biased in the direction to reduce the aperture opening and allow the arm 5a to strike against the protruding part 6a of the preset ring 6, thereby the aperture is reduced to the preset stop value.

When member 19 has received the information that the aperture opening has been reduced to the preset stop value, it strikes a bent portion 16b at the lower end of a mirror actuating lever 16 thereby to rotate the lever 16 counterclockwise about the center of rotation 16d. The mirror actuating lever 16 has a connecting dented part 16e, a connecting hole 16c and a protruding part 16a and is always biased at its upper left side end 16f in the direction to return the quick return mirror 10 into its original position by the action of a spring 30. The connecting dented part 16e is connected with a pin 17d of Mirror actuating lever 17 and the connecting hole 16c is connected with an upper end 17a of the mirror actuating lever 17 through a spring 31, so that the lever 17 may move in conjunction with the movement of lever 16. When the mirror actuating lever 17 is rotated counterclockwise around the center of rotation, 17b in pursuit of the mirror actuating lever 16, a mirror frame supporting member 18 is moved upwardly about the center of rotation 18b by means of pin 17c of the lever 17 which can slide along a groove 18a of the mirror frame supporting metal 18. The quick return mirror 10 is fixedly secured to frame supporting member 18, so that the mirror 10 can also move upwardly. By the upward movement of the mirror 10, aphotoelectric element 11 having a fast photoelectric response becomes irradiated with the incident light and photometry is made. Thereafter, the protruding part 16a of the mirror actuating lever 16 strikes against a hook 20 of a connecting lever 21 biased by the action of a spring 29.

The connecting lever 21 is linked with a connecting lever 22 by means of a pin 21a and the connecting lever 22 is linked with a light receiver retracting lever 23 by means of a pin 22a, so that when the hook 20 is disengaged from the connecting lever 21 the light receiver retracting lever 23 is rotated clockwise around the center of rotation 23c and the left end 23a of the lever 23 moves over and away from the engaging part 12a of the light receiver 12 which is biased by the action of a spring 32 to retract the light receiver 12 out of the optical path. On the other hand, simultaneously with the completion of retraction of the light receiver 12 out of the optical path, the right end 23b of the light receiver retracting lever 23 strikes against and disengages a hook 24. Hook 24 engages gear 25 of drum 13a for the first blind of the shutter, so that the first blind 13 starts its operation and the light passes through an aperture 15 thereby commencing the exposure of the film.

Then, a timing device for controlling the exposure time (shown in FIG. 2) is actuated. After a lapse of time determined by the timing device, a hook 33 is disengaged from a speed control gear 28 of drum 14a for the second blind of the shutter. As a result, the second blind 14 is closed to complete the exposure of the film, and the quick return mirror 10 and the light receiver 12 are returned to their original positions based on the information generated from the second blind of the shutter.

Alternatively, it is also possible to mount the photoelectric element on the first blind of the shutter. The location of the photoelectric element is not essential to the present invention.

As described, according to the present invention, since provision is made such that after the depression of the shutter release button of a camera, the aperture is reduced from its full-opened state to the preset aperture stop value and simultaneously therewith the quick return mirror is caused to jump up, then photometry is carried out with respect to the light passed through the reduced aperture of the stop, and the automatic exposure control is carried out on the basis of the value obtained by the photometry; it is enabled to conduct preliminary operations for taking a photograph such as focus adjustment while looking at a bright view finder field, and also the preset invention serves to entirely eliminate the error of the actually reduced aperture of the stop with respect to the preset aperture stop value, which was inevitable according to the maximum-aperture photometric system in the prior art.

What is claimed is:

1. An automatic exposure control system for a single lens reflex camera of the type having a shutter release, an adjustable aperture, and a quick return mirror comprising:

means for reducing the size of the aperture from its maximum opened state to a selected smaller size, said aperture reducing means being activated by the shutter release, means for causing the quick return mirror to move from a first position in the light path to a second position which does not intercept the light path simultaneously with the reduction of the aperture, a light responsive signal generating element normally situated out of the light path, said element being positioned to intercept the light path and generate a signal responsive to the light detected after said quick return mirror has moved, and means for moving said element after its exposure to the light path to a location which does not intercept the light path, and automatic means for controlling exposure time responsive to said signal.

2. The control system according to claim 1 wherein the light responsive signal generating element is a photo-voltaic element having a fast photoelectric response.

3. The control system according to claim 1 wherein the light responsive signal generating element is disposed behind the quick return mirror.

4. The control system according to claim 1 further comprising an electric shutter whose open time is controlled by said means for controlling exposure time.

5. A method for controlling exposure automatically for a single lens reflex camera of the type having a shutter release, an adjustable aperture, a shutter, a quick return mirror and a light responsive signal generating element comprising:
  reducing the size of the aperture from its maximum-opened state to a preset lesser size when the shutter release button is depressed, activating the quick return mirror to move from its normal position in the light path to a second position which does not intercept the light path simultaneously with the aperture reduction, causing the light responsive signal generating element to intercept the light path after activation of the mirror and to generate a signal responsive to the light detected,
  then moving the light responsive signal generating element out of the light path and
  controlling exposure time in response to said signal.

6. The method according to claim 5 wherein the light responsive signal generating element is a photovotaic element having a fast photoelectric response.

7. The method according to claim 8 wherein said shutter is an electric shutter.

8. The method according to claim 5 wherein the step of causing the light responsive signal generating element to intercept the light path comprises the step of moving the light responsive signal generating element to a position in which it intercepts the light path.

9. The method according to claim 5 wherein the step of causing the light responsive signal generating element to intercept the light path comprises the step of positioning the light responsive signal generating element behind the quick return mirror so that the element will intercept the light path when the mirror is moved to its second position.

* * * * *